US006236927B1

(12) United States Patent
Sherman

(10) Patent No.: US 6,236,927 B1
(45) Date of Patent: May 22, 2001

(54) INTELLIGENT BRAKING SYSTEM FOR MATERIALS HANDLING VEHICLES

(75) Inventor: Nicholas J. Sherman, Minster, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 09/159,297

(22) Filed: Sep. 23, 1998

Related U.S. Application Data

(60) Provisional application No. 60/060,410, filed on Sep. 30, 1997.

(51) Int. Cl.[7] .............................. G06F 19/00; G06F 17/00; G06F 7/00

(52) U.S. Cl. .............................. 701/70; 701/50; 701/65; 701/66; 701/71; 701/72; 701/1

(58) Field of Search .................................. 701/70, 50, 65, 701/66, 71, 72, 1; 303/152, 192, 20, 191, 140; 188/1.12, 60

(56) References Cited

U.S. PATENT DOCUMENTS

| 4,265,337 | 5/1981 | Dammeyer | 187/271 |
|---|---|---|---|
| 4,388,573 | 6/1983 | Horiuchi et al. | 318/376 |
| 4,422,021 | 12/1983 | Schwarz | 318/376 |
| 4,423,363 | 12/1983 | Clark et al. | 318/375 |
| 4,479,080 | 10/1984 | Lambert | 318/373 |
| 4,518,902 | 5/1985 | Melocik et al. | 318/373 |
| 4,634,332 | * 1/1987 | Kamide et al. | 414/273 |
| 4,768,636 | * 9/1988 | Ito et al. | 192/0.08 |
| 4,782,920 | * 11/1988 | Gaibler et al. | 187/9 R |
| 4,908,553 | 3/1990 | Hoppie et al. | 318/382 |
| 5,057,728 | 10/1991 | Dammeyer et al. | 310/77 |

(List continued on next page.)

FOREIGN PATENT DOCUMENTS

| 31 22 720 C1 | 1/1983 | (DE) . |
| 44 34 328 A1 | 3/1996 | (DE) . |
| 0 361 708 | 4/1990 | (EP) . |

OTHER PUBLICATIONS

*1—See GB 2 293 364 A.
Patent Abstracts of Japan, vol. 097, No. 006, Jun. 30, 1997, JP 09 046808 A (Jatco Corp), Feb. 14, 1997.

*Primary Examiner*—William A. Cuchlinski, Jr.
*Assistant Examiner*—Ronnie Mancho
(74) *Attorney, Agent, or Firm*—King and Schickli PLLC

(57) ABSTRACT

A computer controlled braking system utilizes gross vehicle weight of a materials handling vehicle and maximum allowable vehicle speeds to calculate braking force in response to a service brake request. For vehicles equipped with a caster brake, the calculated braking force is proportionally distributed between a drive brake and the caster brake. The drive brake includes a mechanical brake and motor braking which is performed by a traction motor. The drive brake force is divided between the mechanical brake and the motor braking so that the motor provides as much braking as possible to reduce wear on the mechanical brake and also to conserve battery power. For vehicles equipped with a caster brake, the caster brake portion of the calculated braking force is determined as a programmable percentage of the total braking force and can differ based on travel direction. The caster brake portion is clipped and reverts to the drive brake if it is below a minimum; and, if the calculated caster brake force is greater than a maximum, the caster brake force in excess of the maximum is clipped and reverts to the drive brake. A maximum caster brake current can be set to accommodate different brake hardware. A user of the vehicle can select adjustments to the calculated drive brake force and, if provided, can also select independent adjustments to the calculated caster brake force. If the vehicle has not substantially stopped within a given period of time after having its speed reduced to a low speed, the mechanical drive brake is fully applied.

29 Claims, 4 Drawing Sheets

U.S. PATENT DOCUMENTS

| | | | |
|---|---|---|---|
| 5,081,365 | * | 1/1992 | Field et al. ............................. 290/45 |
| 5,103,226 | | 4/1992 | Dammeyer et al. .................. 341/14 |
| 5,234,083 | | 8/1993 | Lee ...................................... 188/267 |
| 5,340,202 | | 8/1994 | Day ........................................ 303/19 |
| 5,415,252 | * | 5/1995 | Estkowski ........................... 188/1.12 |
| 5,497,856 | * | 3/1996 | Block et al. ........................ 188/1.12 |
| 5,579,227 | * | 11/1996 | Simmons, Jr. et al. ........ 364/424.03 |
| 5,586,620 | | 12/1996 | Dammeyer et al. .................. 187/227 |
| 5,598,072 | | 1/1997 | Lambert ............................... 318/376 |
| 5,637,967 | | 6/1997 | Kim ...................................... 318/376 |
| 5,687,081 | * | 11/1997 | Wellman et al. ............. 364/423.098 |
| 5,890,086 | * | 3/1999 | Wellman et al. ....................... 701/50 |
| 5,913,578 | * | 6/1999 | Tozu et al. ........................... 303/140 |
| 6,033,041 | * | 3/2000 | Koga et al. ........................... 303/152 |

* cited by examiner

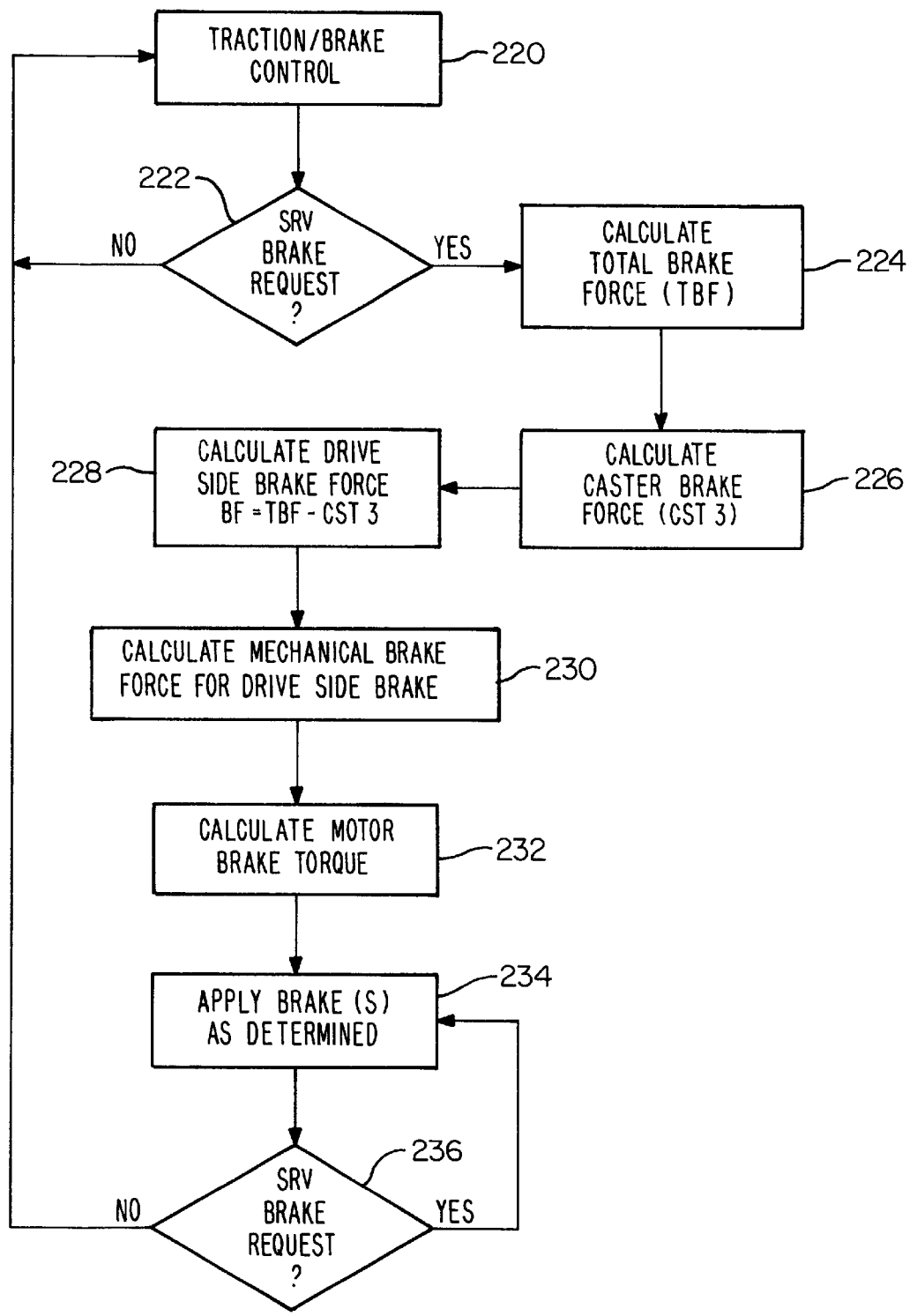

INTELLIGENT BRAKING SYSTEM FOR MATERIALS HANDLING VEHICLES

CROSS-REFERENCE TO RELATED APPLICATIONS

This application claims the benefit of U.S. Provisional Application No. 60/060,410, filed Sep. 30, 1997, which is incorporated herein by reference.

BACKGROUND OF THE INVENTION

The present invention relates in general to materials handling vehicles and, more particularly, to methods and apparatus for braking such vehicles. While the present invention is generally applicable to materials handling vehicles, it will be described herein with reference to a rider reach fork lift truck for which it is particularly applicable and for which it is initially being utilized.

Braking of fork lift trucks may be accomplished through the use of a mechanical brake, such as disclosed in U.S. Pat. No. 5,057,728, which is incorporated herein by reference, or by using the dynamic braking characteristics of the electric traction motor, such as disclosed in U.S. Pat. No. 5,340,202, which is incorporated herein by reference.

The brake shown in the '728 patent is a three-step brake; that is, the brake is capable of providing three levels of braking force, depending upon braking requirements. Of course, mechanical brakes are subject to wear; therefore, to reduce wear, and since regenerative braking using the traction motor conserves battery charge, it is desirable to use the electric motor for as much of the braking requirements as possible. On a rider reach fork lift truck, a single, electrically powered and steerable drive wheel is mounted on one corner of the power unit of the truck, and a caster wheel is mounted on the other corner. For some trucks, the caster wheel is also provided with a brake or a caster brake.

Thus, while motor braking and mechanical braking of the drive wheel and, in some applications also mechanical braking of the caster wheel, are known for materials handling vehicles, there is an ongoing need to improve the methods and apparatus which operate and coordinate these braking systems for improved braking performance. Such improvements would better adapt braking performance for known operating conditions of travel direction and allowable travel speed/fork height, distribute braking requirements between mechanical braking and regenerative braking associated with the steerable drive wheel, use regenerative braking as much as possible, and engage the brake on the caster wheel in proper proportion to the brake on the drive wheel. Preferably, the improved braking control would be computer controlled and hence be easily adaptable in the field and also enable simplified manufacturing of materials handling vehicles utilizing the improved braking control.

SUMMARY OF THE INVENTION

This need is met by the invention of the present application wherein a computer controlled braking system utilizes the gross vehicle weight of a materials handling vehicle and maximum allowable speeds of the vehicle to calculate braking force for the vehicle. The maximum allowable speed is determined based on the direction of travel of the vehicle: forward, i.e., forks forward; and, reverse, i.e., power unit forward, and the height of load carrying forks of the vehicle. For vehicles equipped with a caster brake, the calculated braking force is proportionally and programmably distributed between a drive brake and the caster brake. The drive brake includes a mechanical brake, which is used for braking the vehicle when moving and also holding the vehicle when parked, and motor braking which is performed by a traction motor which drives the drive wheel. The drive brake force, either the total calculated braking force or the drive brake portion of the calculated braking force if a caster brake is provided, is divided between the mechanical brake and the motor braking so that the motor provides as much braking as is possible to reduce wear on the mechanical brake and also to conserve battery power.

For vehicles equipped with a caster brake, the caster brake portion of the calculated braking force is determined as a percentage or proportion of the total braking force. The percentage is programmable and can differ dependent upon the direction of travel of the vehicle. The caster brake portion is reduced to zero or clipped and reverts to the drive brake if it is below a minimum caster brake force. In a similar manner, if the caster brake force is calculated to be greater than a maximum caster brake force, the caster brake force in excess of the maximum caster brake force is clipped and reverts to the drive brake. A maximum caster brake current can be set to accommodate different brake hardware. A user of the vehicle can select adjustments to the calculated drive brake force and, if provided, can also select independent adjustments to the calculated caster brake force.

In accordance with one aspect of the present invention, a method for braking a materials handling vehicle comprises setting a gross vehicle weight for the vehicle, determining a maximum allowable speed for the vehicle, detecting a service brake request and, upon receiving a service brake request, calculating braking force for the vehicle in response to the gross vehicle weight and the maximum allowable speed. The calculated braking force may then be converted into braking control actions. The step of determining a maximum allowable speed for the materials handling vehicle may comprise the steps of determining a height of materials handling forks of the vehicle, and correlating a maximum allowable vehicle speed with the height of materials handling forks of the vehicle. The step of determining a maximum allowable speed for the materials handling vehicle may further comprise determining a direction of travel of the materials handling vehicle, and correlating the maximum allowable vehicle speed with the direction of travel of the vehicle.

The step of calculating braking force may comprise the steps of setting braking force for a materials handling vehicle equal to the gross vehicle weight multiplied by 0.03 times the maximum allowable speed for the materials handling vehicle, and solving the resulting equation. To optimize brake performance for the particular floor conditions, the method may further comprise determining a user adjustment setting for the braking force, and adjusting the braking force with the user adjustment setting.

Preferably, the materials handling vehicle has a drive wheel driven by a traction motor and a mechanical brake associated with the drive wheel, and the braking force is then divided between the two by determining a portion of the braking force to be performed by the mechanical brake, and a portion of the braking force to be performed by operation of the traction motor. The step of determining a portion of the braking force to be performed by operation of the traction motor may comprise subtracting the portion of the braking force to be performed by the mechanical brake and a rolling resistance of the vehicle from the braking force. In that event, if the result of subtracting the braking force to be performed by the mechanical brake and the rolling resistance of the vehicle from the braking force is less than zero, the portion of the braking force to be performed by operation of the traction motor is set to zero.

If the vehicle has a caster brake in addition to a drive brake, the method may comprise determining a caster brake portion of the braking force, and a drive brake portion of the braking force. The step of determining a caster brake portion of the braking force preferably comprises taking a percentage of the braking force as the caster brake portion of the braking force. The method may further comprise taking a first percentage of the braking force as the caster brake portion for vehicle travel in a first direction, and taking a second percentage of the braking force as the caster brake portion for vehicle travel in a second direction opposite to the first direction. The method may further comprise determining a user adjustment setting for the caster brake portion, and adjusting the caster brake portion in accordance with the user adjustment setting. Also, the method may further comprise determining a user adjustment setting for the drive brake portion, and adjusting the drive brake portion in accordance with the user adjustment setting. Preferably, separate and independent user adjustments are available for the caster brake portion and the drive brake portion.

For caster brake operation, a minimum caster brake force may be set with the caster brake portion being compared to the minimum caster brake force and set to zero if the caster brake force is less than the minimum caster brake force. Similarly, a maximum caster brake force may be set with the caster brake portion being compared to the maximum caster brake force and set to the maximum caster brake force if the caster brake force is greater than the maximum caster brake force. The determination of the drive brake portion of the braking force may comprise subtracting the caster brake portion of the braking force from the braking force. Normally, the caster brake is electrical and the method further comprises setting a maximum caster brake current, and limiting current to the caster brake to the maximum caster brake current. In this way, a variety of caster brake hardware can be accommodated. To ensure vehicle stopping, a timer is started when the operating speed of the vehicle falls below a first given speed, such as 1 MPH, and, upon expiration of the timer, if the operating speed exceeds a second given speed, the mechanical brake is fully applied.

In accordance with another aspect of the present invention, a braking system for a materials handling vehicle comprises a computer programmed to: determine a maximum allowable speed for the materials handling vehicle, and calculate braking force for the vehicle in response to a gross vehicle weight and the maximum allowable speed. The gross vehicle weight is normally set in the computer; however, it can be changed if the truck is modified or change is otherwise necessary. The computer may be further programmed to determine a user adjustment setting for the braking force, and adjust the braking force with the user adjustment setting. Preferably, the materials handling vehicle comprises a drive wheel driven by a traction motor and a mechanical brake associated with the drive wheel, and the computer is further programmed to: determine a portion of the braking force to be performed by the mechanical brake, and determine a portion of the braking force to be performed by operation of the traction motor.

When the materials handling vehicle further comprises a caster brake, the computer is further programmed to determine a caster brake portion of the braking force, and determine a drive brake portion of the braking force. The computer can be further programmed to determine a user adjustment setting for the caster brake portion of the braking force, and adjust the caster brake portion of the braking force with the user adjustment setting. Similarly, the computer can be further programmed to determine a user adjustment for the drive brake portion of the braking force, and adjust the drive brake portion of the braking force with the user adjustment setting. Preferably, the computer is programmed to utilize separate and independent user adjustments for the caster brake portion and the drive brake portion.

Where the materials handling vehicle has a drive wheel driven by a traction motor and a mechanical brake associated with the drive wheel, the computer may be further programmed to: determine an operating speed of the vehicle, start a timer when the operating speed of the vehicle falls below a first given speed, upon expiration of the timer determine whether the operating speed exceeds a second given speed, and fully apply the mechanical brake if the operating speed exceeds the second given speed upon expiration of the timer.

It is, thus, an object of the invention of the present application to provide computer control of braking force calculations and adjustments at the time a service brake request is received; to provide braking force calculations based on the gross vehicle weight of a materials handling vehicle and the maximum allowable speed of the vehicle in response to a service brake request; to have different braking efforts depending on the direction of travel in order to take advantage of the difference in the dynamic weight distribution that is a function of travel direction and consequently be able to optimize the braking performance (stopping distance) for each direction of travel; to adjust the individual wheel brake forces in order to optimize the brake performance for the particular floor condition; to properly proportion the brake effort between drive wheel and caster wheel brakes; and, to control the braking effort in accordance with the maximum allowable travel speed (which is a function of fork height and travel direction) in order to improve the dynamic feel of the truck while braking.

Other objects and advantages of the invention will be apparent from the following description, the accompanying drawings and the appended claims.

BRIEF DESCRIPTION OF THE DRAWINGS

FIG. 5 is a flow chart illustrating operation of the braking methods and apparatus of the present invention.

DETAILED DESCRIPTION OF THE INVENTION

Figure 1:
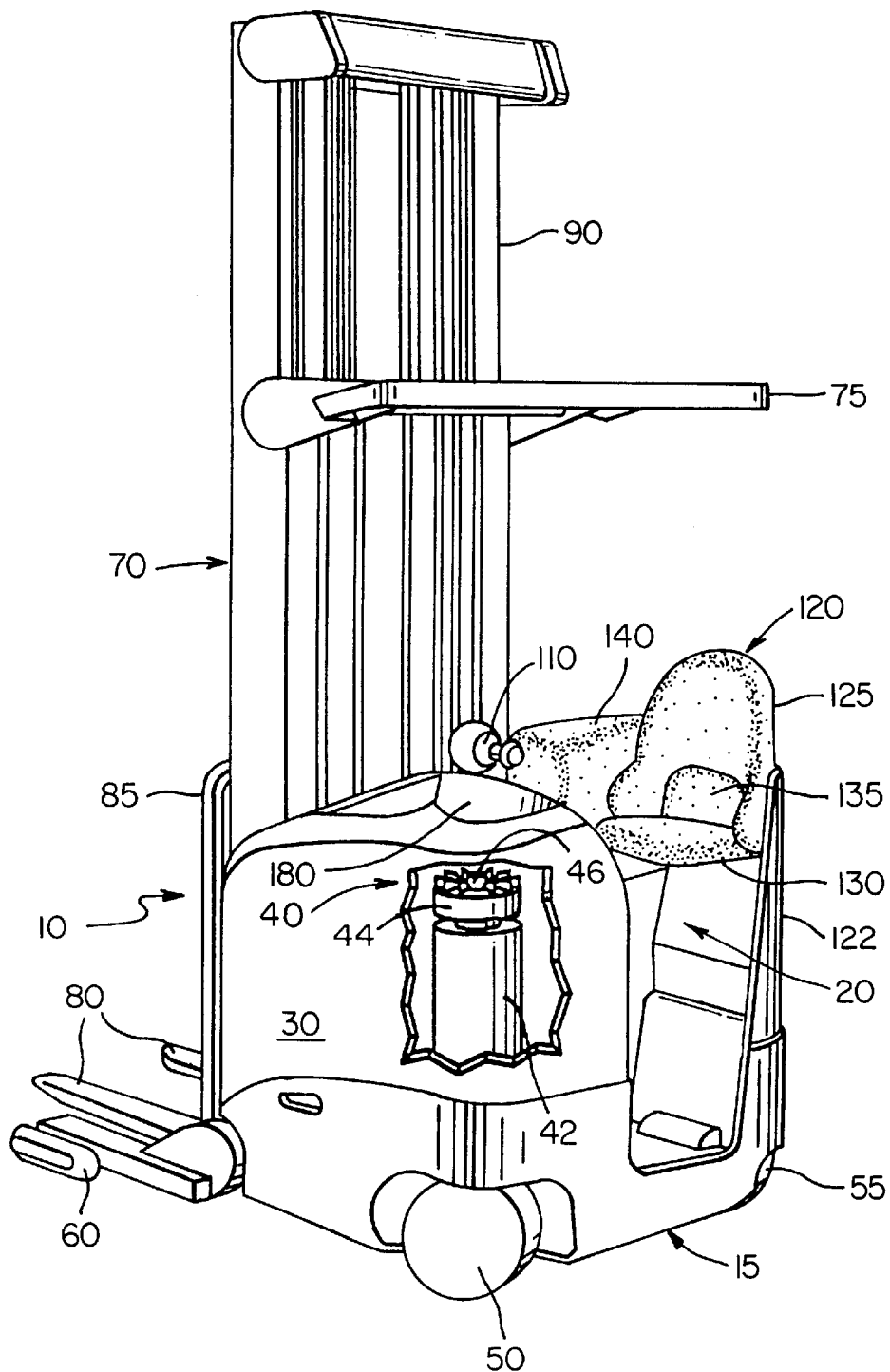
FIG. 1 is a perspective view of a rider reach fork lift truck incorporating the braking methods and apparatus of the present invention.
Figure 2:
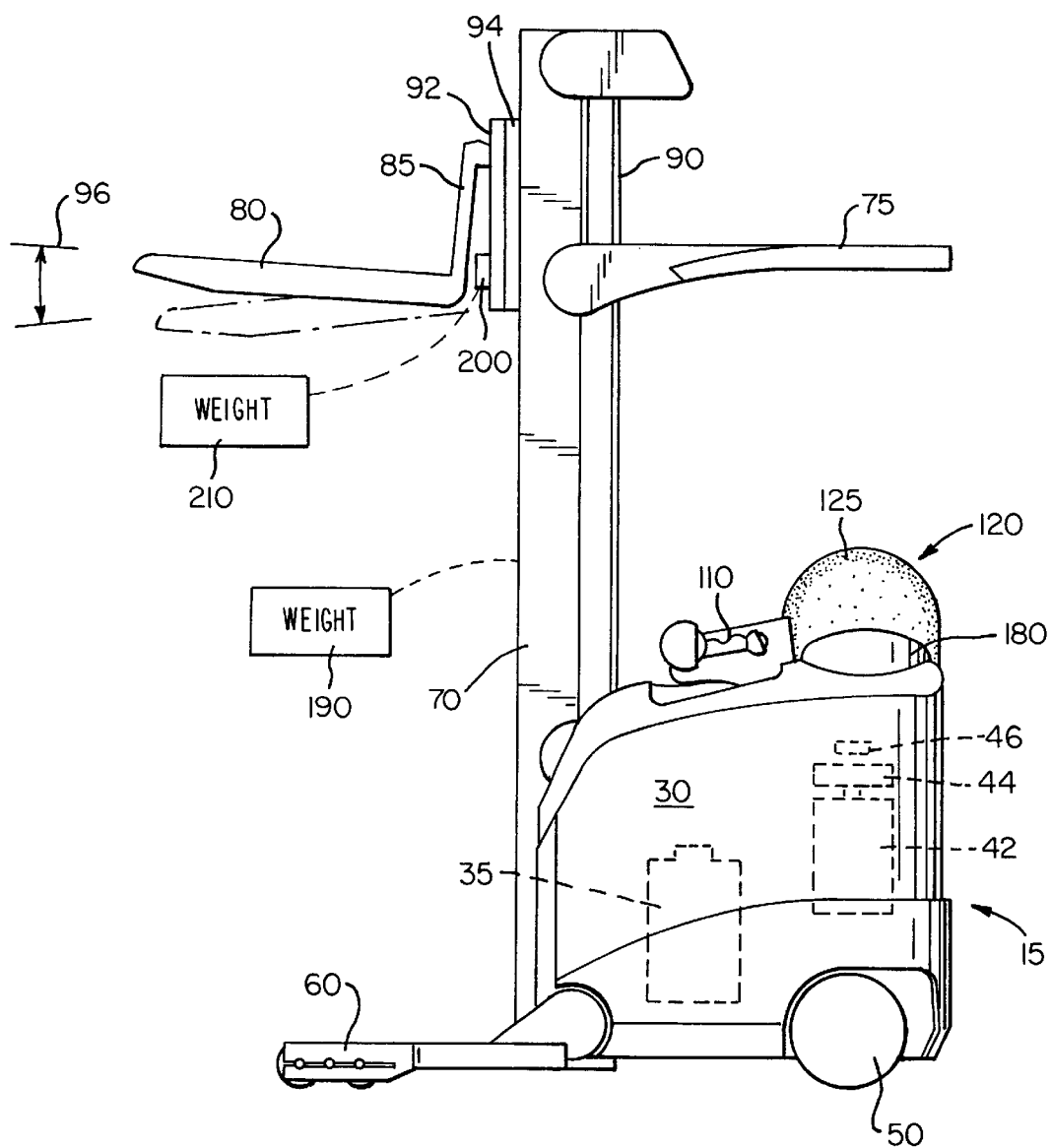
FIG. 2 is a side elevational view of the lift truck of FIG. 1.
Figure 3:
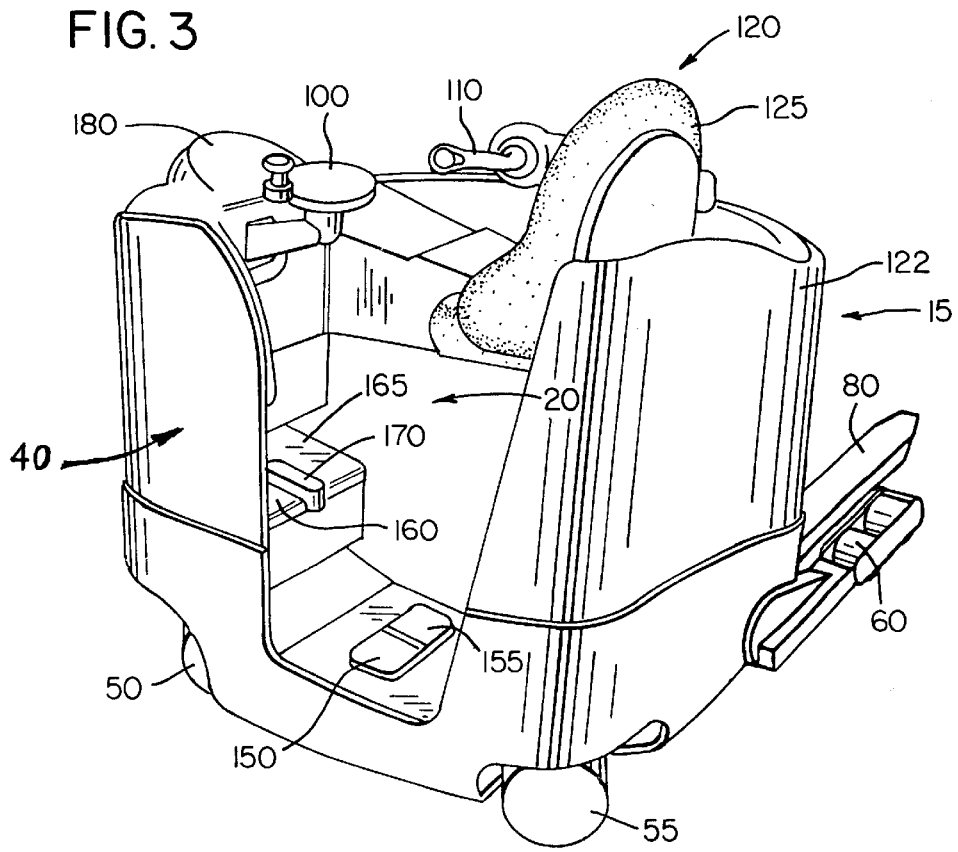
FIG. 3 is an perspective view of a power unit of the truck of FIG. 1, taken from the right rear of the truck.
Figure 4:
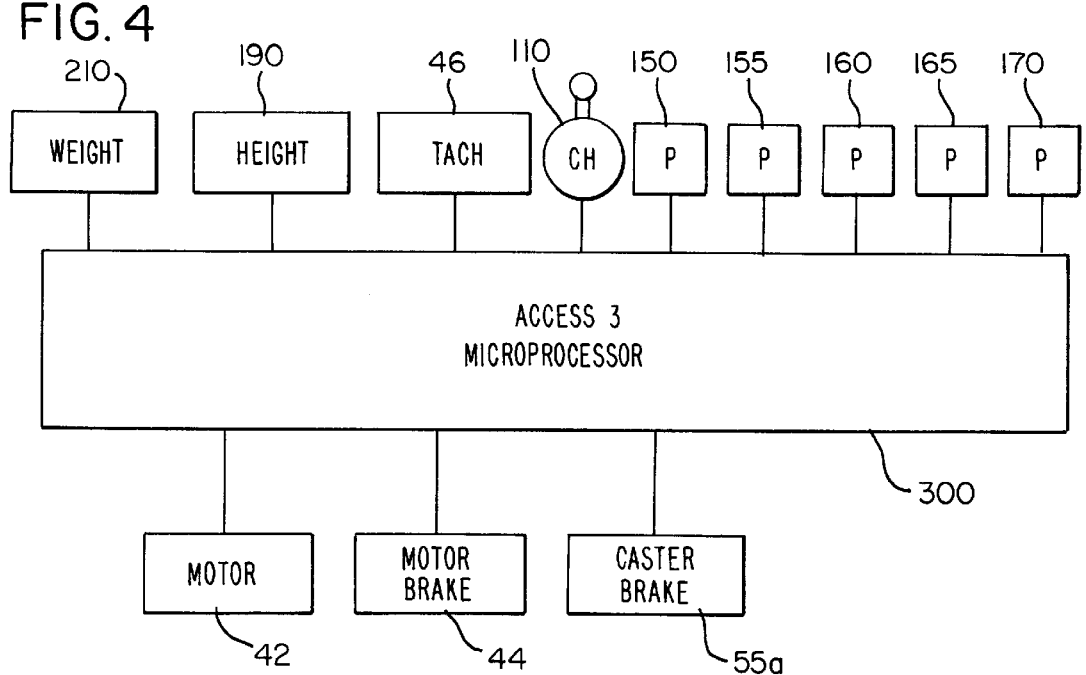
FIG. 4 is a simplified block diagram of the control circuit of the present invention.

FIGS. 1–3 show a rider reach fork lift truck 10 that includes a power unit 15 which includes an operator's compartment 20, a battery compartment 30, and a motor compartment 40. A battery 35, see FIG. 2, in the battery compartment 30 supplies power to a traction motor 42 which is located in the motor compartment 40 and connected to a steerable drive wheel 50 located at the left rear corner of the power unit 15 and to hydraulic motors (not shown) which supply power to several different systems within the truck 10. Attached to the motor 42 is a brake 44 and a tachometer 46. A caster wheel 55 is mounted at the right rear corner of the power unit 15. A conventional caster wheel brake 55a, see FIG. 4, is provided on some trucks. A pair of outriggers 60 support the front end of the truck 10.

In the operator's compartment 20 are mounted a steering tiller 100 for controlling the direction of travel of the truck 10 and a control handle 110 for controlling the speed of travel and the forward and reverse direction of the truck 10 as well as fork height, fork extension, and fork tilt and side-shift.

A mast assembly 70, mounted to the front of the power unit 15 of the truck 10, includes an overhead guard 75. A pair of forks 80 are carried on a fork carriage mechanism 85 which is carried on extendable mast elements 90. The fork carriage mechanism 85 may include a reach mechanism 92 to allow the forks 80 to be extended forward of the mast assembly 70, a side shift mechanism to permit the forks 80 to be moved from side to side relative to the mast assembly 70, and a tilt mechanism to permit the forks 80 to be tilted relative to the horizontal.

As described in U.S. Pat. No. 5,586,620, which is incorporated herein by reference, the reach mechanism 92 is attached to the extensible mast assembly 70 by an assembly 94. A hydraulic cylinder (not shown) is operated by the control handle 110 to control the height of the forks 80. As shown in FIG. 2, the assembly 94 is raised. The height of the forks 80 is measured by a digital encoder, represented at 190, which may be similar to the device shown in U.S. Pat. No. 5,103,226, which is incorporated herein by reference.

The forks 80 may be tilted through a range shown by the arrows 96 by means of a hydraulic cylinder 200 located between the forks 80 and the fork carriage 85. The weight of the load on the forks 80 is measured by a pressure transducer 210 that is attached to a hydraulic line connected to the cylinder 200.

Also located within the operator's compartment 20, depending on the truck model, may be a seat assembly 120 which is attached to the right side 122 of the power unit 15, as shown. When installed, the seat assembly 120 includes a back rest 125, a seat 130, and a shelf 135. The seat assembly is vertically adjustable for operator comfort. An armrest 140 is also supported on the seat assembly 120 for movement therewith.

On the floor of the operator's compartment 20 are two pedals 150 and 155. The left-hand pedal 150 operates an electric switch to control braking of the truck 10 while the right-hand pedal 155 operates a switch indicating the presence of the operator's foot thereon. Also located within the operator's compartment are three additional pedals: a pedal 160 which corresponds to the pedal 150; a pedal 165 which corresponds to the pedal 155; and, a pedal 170 which is an additional brake pedal.

The operator must have one foot on and depress the pedal 150 or 160 in order for the truck 10 to move; otherwise, the truck's brakes will be fully applied. The operator must also depress either pedal 155 or 165 in order for the truck 10 to move, if it is stopped. If the truck 10 is moving, removal of the foot from the pedals 155 or 165 will cause the truck 10 to coast. The switches controlled by pedals 155 and 165 are known as "presence" or "cut back" switches. Pedal 170 is an axillary brake switch. Anytime the operator depresses pedal 170, the brakes of the truck 10 will be immediately applied.

An operator's console 180 provides the operator with information regarding the status of the battery voltage and may provide additional information including indications regarding the fork height and the weight of the load on the forks 80.

The simplified block diagram of FIG. 4 shows various components used in connection with the present invention which are associated with a microprocessor 300 contained in a primary control module, referred to as the Access 3 module, of an electronic control system for the truck 10.

The truck 10 includes two braking modes. In the first mode, commonly referred as "plugging," movement of the handle 110 in the direction opposite to the current direction of travel is recognized as a plugging request and results in braking by action of the traction motor 42. In the second mode, commonly known as service braking, the operator either removes the foot from pedals 150 or 160, or depresses the pedal 170. The methods and apparatus of the present invention perform service braking in response to a service brake request resulting in a combination of regenerative braking performed by the traction motor 42 and mechanical braking performed by the brake 44 and, if a caster brake is provided on the truck, by the caster brake.

In response to the service brake request, the invention of the present application controls the braking of the truck 10 to improve truck braking performance by calculating the braking force to be applied using the gross vehicle weight (GVW) and the maximum allowable travel speed, which is dependent upon the travel direction of the truck 10 and the height of the forks, at the time the service brake request is received. The allocation of braking effort between the mechanical brake, i.e., the brake 44, for the drive wheel 50, and regeneration braking of the traction motor 42 is optimized to reduce wear on the mechanical brake consistent with the ability of the motor 42 to provide the necessary braking torque. On those trucks equipped with a caster brake on the caster wheel 55, allocation of braking effort between the drive brake and the caster brake is also performed based on the truck weight distribution and coefficients of friction of the drive tire and the caster tire. Service braking operations of the invention of the present application, which are performed under the control of the microprocessor 300, will now be described with reference to FIG. 5.

When a service brake request is detected due to operation of one of the brake pedals 150, 160 or 170, the total brake force is calculated based on an American National Standards Institute (ANSI) requirement:

$$\text{Total Brake Force} = (3 \times V \times GVW)/100$$

where GVW is gross vehicle weight in pounds and V is the maximum allowable speed for the vehicle. For the present invention, the GVW used includes the total unloaded weight of the vehicle and the maximum rated load weight for the vehicle, i.e., GVW is the total allowable fully loaded weight for the vehicle. And, V is the maximum allowable speed in miles per hour (MPH) for the fully loaded vehicle. For example, for two different rider reach fork lift truck models of the RR5000 series of fork lift trucks manufactured by the Crown Equipment Corporation, one having a 42" wide power unit and the other having a 48" wide power unit, the maximum allowable speed V is determined from the following table based on the direction of travel of the truck and the fork height:

| | Max Vehicle Speed in MPH | | | |
|---|---|---|---|---|
| Fork Height | 42" FF | 42" PUF | 48" FF | 48" PUF |
| <free lift | 5.7 | 7.2 | 6.2 | 7.5 |
| >free lift <270" CBH | 3.0 | 3.0 | 3.0 | 3.0 |
| >270" CBH | 1.5 | 1.5 | 1.5 | 1.5 | where "FF" means Forks Forward, "PUF" means Power Unit Forward, free lift refers to a staging or collapsed height of the mast of the truck, and CBH refers to a cutback height above which the maximum allowable speed of the truck is reduced to a creep speed of 1.5 MPH.

The total braking force is split or divided between the drive tire and the caster tire based on known weight distribution and tire coefficient of friction. Since the 42" power unit has no caster brake, 100% of the braking is done by the drive tire.

The drive tire brake force or drive brake force is further split between motor regenerative braking and the brake 44 or three-step friction brake on an armature shaft of the motor 42. The motor regenerative braking portion is made as large as possible, up to the practical torque output limit for regeneration. The remaining braking portion is performed by the three-step brake 44. The drive wheel braking force and the caster wheel braking force can each be further adjusted to optimize stopping distance for a particular floor condition. Adjustments are made by the user through operation of a display service menu on the operator's console 180 or other input device to the microprocessor 300.

Accordingly, when a service brake request is received by the microprocessor 300 from switches associated with one of the pedals 150, 160 or 170, for use in traction/brake control, see blocks 220, 222 of FIG. 5, the total brake force (TBF) is calculated, see block 224, using the equation:

$$TBF = GVW \times 0.03 \times V$$

where GVW or gross vehicle weight is set equal to an allowable fully loaded vehicle weight and V is the maximum allowable vehicle velocity obtained, for example, from the above table by using fork height and direction of travel of the truck. By using the GVW of the truck to calculate the total braking force, all trucks with the same allowable speed will produce effectively the same stopping "g" force regardless of truck weights so that the trucks will stop in approximately the same distance if traveling in at the same speed and will have the same stopping "feel" when service braking is performed. The use of gross vehicle weight to calculate the total braking force also makes production of a variety of trucks more simple since the brakes do not need to be adjusted dependent upon the weight of the vehicles, as in the past, but will have appropriate braking forces due to the brake force calculation aspect of the invention of the present application.

After the total braking force is calculated, the caster share of the total braking force, i.e., the amount of braking force which is to be provided by the caster brake of the truck, is determined, see block 226. Of course, if no caster brake is provided on the truck, as is the case of the 42" wide truck, all the braking force is applied by the drive wheel brake 44.

The caster share can be programmed into the microprocessor 300 and can be set to different values depending on whether the truck is traveling in the forward direction (PERF), i.e., with the forks 80 forward, or in the reverse direction (PERR), i.e., with the power unit 15 forward. In a working embodiment of the invention of the present application, a default caster brake portion setting of 25% is utilized (PERF=PERR=25%), due to the weight distribution of the truck 10, with the default brake portion being utilized for both forward and reverse directions of travel. However, any appropriate caster brake portion setting can be made as desired or necessary for a particular truck or operating conditions.

Due to variations in floor conditions and brake hardware, provision is made for adjusting brake forces to optimize braking conditions for a given application. For caster brake adjustments, user performance settings allow the user to adjust the caster brake force applied when the forks are below free lift. Thus, the user selects a multiplier which is used to modify the caster brake force. The multiplier can range from below one to above one with a series of nine stepped percentages ranging from approximately 62% to approximately 127% being utilized in a working embodiment of the present invention. Thus, the operator can select caster brake modifying settings (CSET) of 1 through 9 to optimize caster braking for floor or other operating conditions.

A maximum caster brake value (CSTMAX) can also be set to accommodate differences in brake hardware. If a caster brake value greater than the maximum caster brake value is selected, the caster brake value is set to the maximum caster brake value with the remainder of the requested caster brake value being "clipped" and transferred back to the drive wheel brake to maintain the total brake force calculated above.

A minimum caster brake value is also set (CSTMIN) and if a caster brake value less than the minimum allowable caster brake value is requested, the caster brake value is set to zero with the clipped amount again being transferred back to the drive wheel brake to maintain the total brake force as calculated above. The caster brake also will not be applied if the forks are lifted above a maximum height or caster height (HT). For example, the caster height may be set to the cutback height or other height as required for a given truck.

In summary, an initial caster brake force (CST1) is calculated by taking the caster brake percentage (PERC) of the total braking force. It is noted that different caster brake percentages can be used for forward travel (PERC=PERF) and reverse travel (PERC=PERR) of the truck:

$$CST1 = TBF \times PERC$$

Next, any user adjustment is made by multiplying CST1 by the user adjustment (CSET) to obtain a user modified or adjusted caster brake force (CST2):

$$CST2 = CST1 \times CSET$$

The fork height is then compared to the caster height and, if greater than the caster height (HT), a final caster brake force (CSET3) is set to zero:

$$CST3 = 0$$

The final caster brake force (CST3) is also set to zero if CST2 is less than the minimum allowable caster brake value (CSTMIN). If these instances do not apply, then CST2 is tested to see if it exceeds the maximum caster brake force (CSTMAX) and if so CST3 is set equal to the maximum caster brake force:

$CST3=CSTMAX$

If none of these instances apply, then CST3 is set equal to CST2:

$CST3=CST2$

Once the force to be applied by the caster brake CST3 has been determined, the caster brake current (CSTAMP) or current to be applied to the caster brake must be determined. The caster brake current is dependent upon the caster brake hardware and can be calculated by the microprocessor 300; however, in a working embodiment of the invention of the present application a caster brake lookup table is utilized. For a specific caster brake used on the 48" truck the following lookup table applies:

| CSTAMP (Current) | i | CST3 (Force) |
|---|---|---|
| 0 | 1 | 0 |
| 0.5 | 2 | 0 |
| 1.0 | 3 | 160 |
| 1.5 | 4 | 370 |
| 2.0 | 5 | 550 |
| 2.5 | 6 | 665 |
| 3.0 | 7 | 755 |
| 3.5 | 8 | 815 |
| 4.0 | 9 | 865 |

The caster brake current (CSTAMP) is determined by using the required caster brake force (CST3) to enter the table and then interpolating within the table. For example, the caster brake force (CST3) may be compared to the table forces until the force read from the table is greater than CST3, i.e, if a caster force of 800 pounds is required, an initial entry into the table is made at a force of 815 pounds (i=8) which is greater than the required 800 pounds. Interpolation can then be performed by subtracting the force at i−1 from the required force (800−755) and dividing the result by the force at i minus the force at i−1 (815−755) to obtain an interpolation fraction which is multiplied by the current difference from table entry i to table entry i−1 to obtain an interpolation current. The interpolation current is then added to the caster current value at the i−1 entry to obtain the required caster brake current (CSTAMP).

To accommodate caster brake hardware differences, a maximum caster current value (CST_MAXAMP) can be set so that the current to the caster brake will never go above the maximum caster current value. If CST3 is greater than the highest caster brake force in the table, the caster brake current is then set to the maximum caster current value:

$CSTAMP=CST\_MAXAMP$

Having completed determination of the caster brake share for service braking, the drive side share for service braking is determined, see block 228. The drive side brake force (BF) share is determined by subtracting the caster share of the braking from the total braking force (TBF) calculated above and adding back any adjustments that were made due to limitations of the caster braking. More particularly, the initial caster brake force (CST1) is subtracted from the total braking force (TBF) to find the original percentage of the total braking force to be provided by the drive side brake. Adjustments to the original percentage drive side braking force are calculated by subtracting the final caster brake force (CSET3) from the adjusted caster brake force (CST2) with the result being added to the original percentage drive side braking force to obtain the drive side brake force (BF).

As with the caster brake force, due to variations in floor conditions and brake hardware, provision is made for adjusting the drive brake force to optimize braking conditions for a given application. For drive brake adjustments, user performance settings allow the user to adjust the drive brake force applied when the forks are below free lift. Thus, the user selects a multiplier which is used to modify the drive brake force. The multiplier can range from below one to above one with a series of nine stepped percentages ranging from approximately 62% to approximately 127% being utilized in a working embodiment of the present invention. Thus, the operator can select drive brake modifying settings (DSET) of 1 through 9 to optimize drive braking for floor or other operating conditions:

$BF=[(TBF-CST1)+(CST2-CST3)]\times DSET$

Once the drive side brake force is finally determined, it has to be distributed between the motor 42 and the mechanical brake 44 with the motor 42 providing as much braking force as possible. To ensure that calculated braking forces do not exceed the capability of the braking devices, limits are placed on the calculated braking forces. The maximum braking force that the mechanical brake 44 can supply is defined as parking brake maximum (PBMAX) and the maximum motor regeneration braking force is defined as (SEMAX). The rolling resistance (RR) of the truck is also taken into consideration when calculating the drive side brake force with the rolling resistance of the truck being defined by:

$RR=GVW\times 0.016$ where GVW again is the gross vehicle weight which is set equal to the total allowable fully loaded vehicle weight.

The motor and friction or mechanical brake forces are then found by first determining the minimum step brake (STEPBK) level (1/2, 2/3 or 3/3) required to keep the motor force from exceeding its limit (SEMAX), see block 230. Thus:

if $(BF-(SEMAX+RR))>(2/3)$ then STEPBK=3/3; otherwise,
if $(BF-(SEMAX+RR))>(1/3)$ then STEPBK=2/3; otherwise, STEPBK=1/3.

Next the motor torque setpoint is determined by subtracting a calculated step brake force (STEPBK_FR) and the rolling resistance (RR) from the drive side brake force (BF) and converting it to torque at the motor 42, see block 232.

MOTOR=(BF−STEP$BK\_FR$−RR)[if MOTOR<0 set MOTOR=0]

where STEPBK_FR=0.132×GVW×1/3, 2/3 or 3/3.

BRAKE T=MOTOR×TORQUE_CONVERSION_CONST where TORQUE_CONVERSION_CONST is a constant which converts braking force at the tire to torque at the motor for a given vehicle and calculation of this constant is well known to those skilled in the art. For example, this constant for the RR5000 series of fork lift trucks manufactured by the Crown Equipment Corporation is calculated to be equal to 0.04315. Having determined the caster and drive brake forces, the brakes are applied, see block 234. The applied braking force is maintained until the service brake request is terminated, see block 236, at which time the traction/brake control within the microprocessor 300 once again awaits the next service brake request, see block 220.

Since the motor regeneration torque begins to decay at speeds less than 1 MPH, the mechanical friction brake 44

(and the caster brake, if provided) are required to bring the truck 10 to a complete stop and hold it, for example when parked. When service braking is applied, the mechanical friction brake 44, or step brake may be applied at any of its three steps of braking (1/3, 2/3 or 3/3) with 3/3 being the brake step required to hold the truck 10 on a 15% grade. If the truck is braking on a grade and the step brake has been applied at a level less than 3/3, the truck may not be able of coming to a complete stop without additional braking from the brake 44. Accordingly, a time out is provided to fully apply the step brake to 3/3 in the event the truck has not come to a complete stop within a given period of time.

After service braking is applied as described above, a timer (TBRAMP_COUNT) is started when the speed of the truck falls below a given speed (BRFLIP_SPEED), for example 1 MPH. If the actual sped of the truck is greater than a programable speed (BRAKE_ZEROSPEED), for example 0 MPH, after TBRAMP_COUNT times out, for example at 2 seconds, the brake 44 is applied at its full step value 3/3.

Having thus described the invention of the present application in detail and by reference to preferred embodiments thereof, it will be apparent that modifications and variations are possible without departing from the scope of the invention defined in the appended claims.

What is claimed is:

1. A method for braking a materials handling vehicle comprising the steps of:

setting a gross vehicle weight for a materials handling vehicle;

determining a maximum allowable speed for said materials handling vehicle;

detecting a service brake request; and upon receiving a service brake request, calculating braking force for said vehicle in response to said gross vehicle weight and said maximum allowable speed.

2. A method for braking the materials handling vehicle as claimed in claim 1 further comprising the step of converting said braking force into braking control actions.

3. A method for braking the materials handling vehicle as claimed in claim 1 wherein said step of determining a maximum allowable speed for said materials handling vehicle comprises the steps of:

determining a height of materials handling forks of said vehicle; and correlating a maximum allowable vehicle speed with said height of materials handling forks of said vehicle.

4. A method for braking the materials handling vehicle as claimed in claim 3 wherein said step of determining a maximum allowable speed for said materials handling vehicle further comprises the steps of:

determining a direction of travel of said materials handling vehicle; and correlating said maximum allowable vehicle speed with said direction of travel of said vehicle.

5. A method for braking the materials handling vehicle as claimed in claim 1 wherein said step of calculating braking force upon receiving a service brake request comprises the steps of:

setting braking force for a materials handling vehicle equal to the gross vehicle weight multiplied by 0.03 times the maximum allowable speed for said materials handling vehicle; and solving the resulting equation.

6. A method for braking the materials handling vehicle as claimed in claim 1 further comprising the steps of:

determining a user adjustment setting for said braking force; and adjusting said braking force with said user adjustment setting.

7. A method for braking the materials handling vehicle as claimed in claim 2 wherein said materials handling vehicle has a drive wheel driven by a traction motor and a mechanical brake associated with said drive wheel, and said step of converting said braking force into braking control actions comprises the steps of:

determining a portion of said braking force to be performed by said mechanical brake; and determining a portion of said braking force to be performed by operation of said traction motor.

8. A method for braking the materials handling vehicle as claimed in claim 7 wherein said step of determining a portion of said braking force to be performed by operation of said traction motor comprises the step of subtracting said portion of said braking force to be performed by said mechanical brake and a rolling resistance of said vehicle from said braking force.

9. A method for braking the materials handling vehicle as claimed in claim 8 further comprising the step of setting said portion of said braking force to be performed by operation of said traction motor to zero if the result of subtracting said braking force to be performed by said mechanical brake and said rolling resistance of said vehicle from said braking force is less than zero.

10. A method for braking the materials handling vehicle as claimed in claim 2 wherein said vehicle has a drive brake and a caster brake and said step of converting said braking force into braking control actions comprises the steps of:

determining a caster brake portion of said braking force; and determining a drive brake portion of said braking force.

11. A method for braking the materials handling vehicle as claimed in claim 10 wherein said step of determining a caster brake portion of said braking force comprises the step of taking a percentage of said braking force as said caster brake portion of said braking force.

12. A method for braking the materials handling vehicle as claimed in claim 11 further comprising the steps of:

taking a first percentage of said braking force as said caster brake portion for vehicle travel in a first direction; and taking a second percentage of said braking force as said caster brake portion for vehicle travel in a second direction opposite to said first direction.

13. A method for braking the materials handling vehicle as claimed in claim 10 further comprising the steps of:

determining a user adjustment setting for said caster brake portion; and adjusting said caster brake portion with said user adjustment setting.

14. A method for braking the materials handling vehicle as claimed in claim 13 further comprising the steps of:

determining a user adjustment setting for said drive brake portion; and adjusting said drive brake portion with said user adjustment setting.

15. A method for braking the materials handling vehicle as claimed in claim 10 further comprising the steps of:

determining a user adjustment setting for said drive brake portion; and adjusting said drive brake portion with said user adjustment setting.

16. A method for braking the materials handling vehicle as claimed in claim 10 further comprising the steps of:
  setting a minimum caster brake force;
  comparing said caster brake portion to said minimum caster brake force; and
  setting said caster brake force to zero if said caster brake force is less than said minimum caster brake force.

17. A method for braking the materials handling vehicle as claimed in claim 10 further comprising the steps of:
  setting a maximum caster brake force;
  comparing said caster brake portion to said maximum caster brake force; and
  setting said caster brake force to said maximum caster brake force if said caster brake force is greater than said maximum caster brake force.

18. A method for braking the materials handling vehicle as claimed in claim 10 wherein said step of determining a drive brake portion of said braking force comprises the step of subtracting said caster brake portion of said braking force from said braking force.

19. A method for braking the materials handling vehicle as claimed in claim 10 wherein said caster brake is electrical and said method further comprises the steps of:
  setting a maximum caster brake current; and
  limiting current to said caster brake to said maximum caster brake current.

20. A method for braking the materials handling vehicle as claimed in claim 7 further comprising the steps of:
  determining an operating speed of said vehicle;
  starting a timer when said operating speed of said vehicle falls below a first given speed;
  upon expiration of said timer determining whether said operating speed exceeds a second given speed; and
  fully applying said mechanical brake if said operating speed exceeds said second given speed upon expiration of said timer.

21. A braking system for a materials handling vehicle comprising:
  a computer programmed to:
    determine a maximum allowable speed for said materials handling vehicle; and
    calculate braking force for said vehicle in response to a gross vehicle weight and said maximum allowable speed.

22. A braking system for the materials handling vehicle as claimed in claim 21 wherein said gross vehicle weight is set in said computer.

23. A braking system for the materials handling vehicle as claimed in claim 21 wherein said computer is further programmed to:
  determine a user adjustment setting for said braking force; and
  adjust said braking force with said user adjustment setting.

24. A braking system for the materials handling vehicle as claimed in claim 21 wherein said materials handling vehicle further comprises a drive wheel driven by a traction motor and a mechanical brake associated with said drive wheel, and said computer is further programmed to:
  determine a portion of said braking force to be performed by said mechanical brake; and
  determine a portion of said braking force to be performed by operation of said traction motor.

25. A braking system for the materials handling vehicle as claimed in claim 21 wherein said materials handling vehicle further comprises a drive brake and a caster brake and said computer is further programmed to:
  determine a caster brake portion of said braking force; and
  determine a drive brake portion of said braking force.

26. A braking system for the materials handling vehicle as claimed in claim 25 wherein said computer is further programmed to:
  determine a user adjustment setting for said caster brake portion of said braking force; and
  adjust said caster brake portion of said braking force with said user adjustment setting for said caster brake portion.

27. A braking system for the materials handling vehicle as claimed in claim 26 wherein said computer is further programmed to:
  determine a user adjustment setting for said drive brake portion of said braking force; and
  adjust said drive brake portion of said braking force with said user adjustment setting for said drive brake portion.

28. A braking system for the materials handling vehicle as claimed in claim 25 wherein said computer is further programmed to:
  determine a user adjustment setting for said drive brake portion of said braking force; and
  adjust said drive brake portion of said braking force with said user adjustment setting for said drive brake portion.

29. A braking system for the materials handling vehicle as claimed in claim 21 wherein said materials handling vehicle has a drive wheel driven by a traction motor and a mechanical brake associated with said drive wheel, said computer being further programmed to:
  determine an operating speed of said vehicle;
  start a timer when said operating speed of said vehicle falls below a first given speed;
  upon expiration of said timer determine whether said operating speed exceeds a second given speed; and
  fully apply said mechanical brake if said operating speed exceeds said second given speed upon expiration of said timer.

* * * * *